(12) United States Patent
Kela et al.

(10) Patent No.: US 10,771,184 B2
(45) Date of Patent: Sep. 8, 2020

(54) CONTROL ENTITY, ACCESS NODE, USER EQUIPMENT AND METHODS

(71) Applicant: HUAWEI TECHNOLOGIES CO., LTD., Shenzhen (CN)

(72) Inventors: Petteri Kela, Helsinki (FI); Mario Costa, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/958,003

(22) Filed: Apr. 20, 2018

(65) Prior Publication Data

US 2018/0254849 A1 Sep. 6, 2018

Related U.S. Application Data

(63) Continuation of application No. PCT/EP2015/074309, filed on Oct. 21, 2015.

(51) Int. Cl.
*H04B 3/46* (2015.01)
*H04L 1/00* (2006.01)
(Continued)

(52) U.S. Cl.
CPC .......... *H04L 1/0003* (2013.01); *H04L 1/0009* (2013.01); *H04L 1/0026* (2013.01);
(Continued)

(58) Field of Classification Search
CPC ... H04L 1/0003; H04L 1/0009; H04L 1/0026; H04L 2001/0092; H04W 72/00; H04W 72/1231; H04W 72/1278
(Continued)

(56) References Cited

U.S. PATENT DOCUMENTS 7,072,315 B1 7/2006 Liu et al.
9,167,434 B2 * 10/2015 Li .................. H04W 16/14
(Continued)

FOREIGN PATENT DOCUMENTS

CN 1470145 A 1/2004
CN 102550106 A 7/2012
(Continued)

OTHER PUBLICATIONS

"Mobile and wireless communications Enablers iorthe Twenty-twenty Information Society (METIS). METIS Channel Models, Deliverable D1.4, Version:3, Feb. 2015, 224 pages".
(Continued)

*Primary Examiner* — Helene E Tayong
(74) *Attorney, Agent, or Firm* — Kilpatrick Townsend & Stockton LLP (57) ABSTRACT

The embodiment of the present invention relates to a control entity (101, 201, 301, 401, 501) for connecting to at least a first access node (ANd1) and at least a second access node (ANd2, ANd3, ANd4). According to the instructions of the control entity, key interference information is shared between ANds or ANd clusters, a Signal-to-Interference-plus-Noise Ratio (SINR) value is calculated based on the key interference information by the ANds or ANd clusters which received the shared key interference information, and a modulation and coding scheme (MCS) for each user is chosen based on the SINR by the ANds or ANd clusters.

7 Claims, 4 Drawing Sheets

(51) Int. Cl.
*H04W 72/00* (2009.01)
*H04W 72/12* (2009.01)

(52) U.S. Cl.
CPC ....... *H04W 72/00* (2013.01); *H04W 72/1231* (2013.01); *H04W 72/1278* (2013.01); *H04L 2001/0092* (2013.01)

(58) Field of Classification Search
USPC ....................................................... 375/227
See application file for complete search history.

(56) References Cited

U.S. PATENT DOCUMENTS

| | | | |
|---|---|---|---|
| 2004/0202127 | A1 | 10/2004 | Loh et al. |
| 2011/0306349 | A1* | 12/2011 | Hakola ................ H04W 28/04 455/450 |
| 2012/0127880 | A1* | 5/2012 | Yu ........................ H04W 48/20 370/252 |
| 2013/0088986 | A1 | 4/2013 | Xiao et al. |
| 2013/0343215 | A1 | 12/2013 | Li et al. |
| 2014/0204857 | A1 | 7/2014 | Mallik et al. |
| 2015/0009852 | A1 | 1/2015 | Chen et al. |
| 2015/0016411 | A1 | 1/2015 | Xiao et al. |
| 2015/0245358 | A1* | 8/2015 | Schmidt ............. H04L 43/0888 370/329 |
| 2017/0272130 | A1 | 9/2017 | Wang et al. |

FOREIGN PATENT DOCUMENTS

| | | |
|---|---|---|
| CN | 103326764 A | 9/2013 |
| CN | 103503352 A | 1/2014 |
| CN | 103843265 A | 6/2014 |
| CN | 103986509 A | 8/2014 |
| CN | 104937871 A | 9/2015 |
| WO | 0231991 A2 | 4/2002 |
| WO | 2011069534 A1 | 6/2011 |
| WO | 2012075387 A1 | 6/2012 |
| WO | 2015117508 A1 | 8/2015 |

OTHER PUBLICATIONS

F. Boccardi et al, Why to Decouple the Uplink and Downlink, in Cellular Networks and How to Do It. (arXiv:1503.06746), Mar. 23, 2015, 14 pages.

H. Elshaer et al, Downlink and Uplink Decoupling: A Disruptive Architectural Design for 5G Networks (arXiv:1405.1853), May 8, 2014, 6 pages.

"3GPP TS 36.300 V12.5.0 3rd Generation Partnership Project;Technical Specification Group Radio Access Network; Evolved Universal Terrestrial Radio Access (E-UTRA) and Evolved Universal Terrestrial Radio Access Network (E-UTRAN);Overall description;Stage 2(Release 12), Technical Specification, Mar. 2015, 251 pages".

"3GPP TS 36.423 V12.5.0 3rd Generation Partnership Project;Technical Specification Group Radio Access Network(E-UTRAN);X2 application protocol (X2AP)(Release 12), Technical Specification, Mar. 2015, 208 pages".

"3GPP TR 36.819 V11.2.0 3rd Generation Partnership Project;Technical Specification Group Radio Access Network; Coordinated multi-point operation for LTE physical layer aspects(Release 11), Technical Report, Sep. 2013, 70 pages".

B. D. Van Veen and K. M. Buckley, Beamforming: A Versatile Approach to Spatial Filtering, IEEE ASSP Magazine, Apr. 1988. 21 pages.

Harry L. Van Trees, Optimum Array Processing: Part IV of Detection, Estimation, and Modulation Theory, Apr. 4, 2002, 2 pages.

* cited by examiner

CONTROL ENTITY, ACCESS NODE, USER EQUIPMENT AND METHODS

CROSS-REFERENCE TO RELATED APPLICATIONS

This application is a continuation of International Application No. PCT/EP2015/074309, filed on Oct. 21, 2015, the disclosure of which is hereby incorporated by reference in its entirety.

TECHNICAL FIELD

The embodiments of the present invention relates to a control entity and an access node. Furthermore, the embodiments of the present invention also relates to corresponding methods, a computer program, and a computer program product.

BACKGROUND

Interference is a problem in wireless communication systems. A user node (UN) may experience interference from two or more access nodes (ANds). There is thus a need to handle interference in current and future wireless communication systems in order to increase the data-rates users at the cell edges. Further to this, in ultra-dense networks, significant interference may also be experienced by users that are not at cell-edges.

SUMMARY

An objective of embodiments of the present invention is to provide a solution which mitigates or solves the drawbacks and problems of conventional solutions.

The above objectives are solved by the subject matter of the independent claims. Further advantageous implementation forms of the present invention can be found in the dependent claims.

According to a first aspect of the embodiments of the present invention, the above mentioned and other objectives are achieved with a control entity for connecting to at least a first access node and at least a second access node, wherein the control entity is configured to
a. instruct the second access node to share an interference leakage towards users, and to
b. instruct the first access node to calculate a Signal-to-Interference-plus-Noise Ratio, SINR, value based on the interference leakage from the second access node;
c. instruct the first access node to choose a modulation and coding scheme, MCS, for each user based on the SINR of the second access node.

The solution is based on sharing key interference information between neighboring ANds or neighboring ANd clusters or UNds. This makes it possible to predict or mitigate the inter-cluster/inter-cell interference. It allows for coordinating the interference between neighboring access nodes or clusters in Multi-User Multiple-Input Multiple-Output (MU-MIMO) systems. The interference experienced by users in MU-MIMO systems may be predicted. Another advantage is that the modulation and coding scheme, MCS, may be determined more accurately, thus increasing the overall system throughput. Further, joint link adaptation may be performed in cluster borders with low requirements on data exchange.

According to a first possible implementation form of the embodiments of the present invention according to the first aspect, the control entity is further configured to
a. instruct the first access node to share an interference leakage towards users, and to
b. instruct the second access node to calculate a SINR value based on the interference leakage from the first access node;
c. instruct the second access node to choose a modulation and coding scheme, MCS, for each user based on the SINR of the first access node.

Thus the first and second access nodes may both take into account the interference leakage information of users connected to the other respective access node.

According to a second possible implementation form of the embodiments of the present invention according to the first possible implementation form of the embodiments of the present invention according to the first aspect the control entity is configured to instruct the first access node to share the interference leakage toward users directly to the second access node. Thus the interference leakage may be shared directly from the first access node to the second access node without indirect communicating it via the control entity.

According to a third possible implementation form of the embodiments of the present invention according any one of the previous implementation forms of the first aspect, or to the first aspect as such, the control entity is configured to instruct the second access node to share the interference leakage toward users directly to the first access node. Thus the interference leakage may be shared directly from the second access node to the first access node without indirect communicating it via the control entity.

According to a fourth possible implementation form of the embodiments of the present invention according any one of the previous implementation forms of the first aspect, or to the first aspect as such, the control entity is configured to instruct the first access node to perform a re-scheduling of one or more users if the interference leakage of the second access node is above a threshold level. Thus if the interference of a user is too high, this particular user may be re-scheduled e.g. to next available transmission time interval (TTI) with uplink resources available.

According to a fifth possible implementation form of the embodiments of the present invention according any one of the previous implementation forms of the first aspect, or to the first aspect as such, the control entity is configured to communicate with the at least one second access node via a second control entity. Thus communication may be performed between two or more control entities, each communicating with one or more user nodes.

According to a second aspect, the embodiments of the present invention relates to an access node for a wireless communication system, wherein the access node is configured to;
a. receive interference leakage towards users of a second access node,
b. calculate a SINR value based on the interference leakage from the second access node, and
c. choose a modulation and coding scheme, MCS, for each user based on the SINR of the second access node.

The solution is thus based on sharing key interference leakage information between neighboring ANds or neighboring ANd clusters or UNds. This makes it possible to predict or mitigate the inter-cluster/inter-cell interference. It allows for coordinating the interference between neighboring access nodes or clusters in MU-MIMO systems. The interference experienced by users in MU-MIMO systems may be predicted. Another advantage is that the modulation and coding scheme, MCS, may be determined more accurately, thus increasing the overall system throughput. Further, joint link adaptation may be performed in cluster borders with low requirements on data exchange.

According to a first possible implementation form of the embodiments of the present invention according to the second aspect, the access node is further configured to obtain interference leakage towards users of the access node and to share the interference information of the access node to the second access node.

According to a second possible implementation form of the embodiments of the present invention according to the first possible implementation form of the embodiments of the present invention according to the second aspect the access node is configured to, prior to receiving the interference leakage of the access node, create a scheduling decision of one or more users.

According to a third possible implementation form of the embodiments of the present invention according to the second possible implementation form of the embodiments of the present invention according to the second aspect the access node configured to perform a re-scheduling of the one or more users if the interference leakage of the second access node is above a threshold level.

According to a fourth possible implementation form of the embodiments of the present invention according any one of the previous implementation forms of the second aspect, or to the second aspect as such, access node is configured to transmit data to a user by directing transmitted power from the access node. Thus the interference experienced by the user may be reduced.

According to a fifth possible implementation form of the embodiments of the present invention according any one of the previous implementation forms of the second aspect, or to the second aspect as such, the access node comprises a timer, wherein the access node is configured to wait for the receipt of the interference leakage of the second access node until the timer expires, and to proceed with the calculation of the SINR value and choosing a MCS if the interference leakage of the second access node is received before expiry of the timer. Thus the access node may wait for the interference information in a manner such that it does not compromise other system related tasks.

According to a sixth possible implementation form of the embodiments of the present invention according any one of the previous implementation forms of the second aspect, or to the second aspect as such, the access node comprises a control entity according to any one of the implementation forms of the first aspect, or the first aspect as such.

According to a third aspect, the embodiments of the present invention relates to a method for a wireless communication system, the method comprising;
a. receiving interference leakage towards users of a second access node,
b. calculating a SINR value based on the interference leakage from the second access node, and
c. choosing a modulation and coding scheme, MCS, for each user of a first access node based on the SINR of the second access node.

According to a first possible implementation form of the embodiments of the present invention according to the third aspect the method comprises instructing the first access node to share the interference leakage toward users directly to the second access node.

According to a second possible implementation form of the embodiments of the present invention according any one of the previous implementation forms of the third aspect, or to the third aspect as such, the method comprises sharing the interference leakage toward users directly from the second access node to the first access node.

According to a third possible implementation form of the embodiments of the present invention according any one of the previous implementation forms of the third aspect, or to the third aspect as such, the method comprises performing a re-scheduling of one or more users if the interference leakage of the second access node is above a threshold level.

According to a fourth possible implementation form of the embodiments of the present invention according any one of the previous implementation forms of the third aspect, or to the third aspect as such, the method comprises communicating with the at least one second access node indirectly, via a second control entity.

According to a fifth possible implementation form of the embodiments of the present invention according any one of the previous implementation forms of the third aspect, or to the third aspect as such, the method comprises, prior to receiving the interference leakage of the other access node, creating a scheduling decision of one or more users.

According to a sixth possible implementation form of the embodiments of the present invention according to the fifth possible implementation form of the embodiments of the present invention of the third aspect the method comprises performing a re-scheduling of the one or more users if the interference leakage of the other access node is above a threshold level.

According to a seventh possible implementation form of the embodiments of the present invention according any one of the previous implementation forms of the third aspect, or to the third aspect as such, the method comprises waiting for a predetermined period of time for the receipt of the interference leakage of the other access node, and to proceed with the calculation of the SINR value and choosing a MCS if the interference leakage of the second access node is received before expiry of the predetermined period of time.

According to a fourth aspect the embodiments of the present invention relates to a computer program with a program code for performing a method according to any possible implementation for of the third aspect, or the third aspect as such, when the computer program runs on a computer. The embodiments of the present invention also relates to a computer program, characterized in program code means, which when run by processing means causes said processing means to execute any method according to the embodiments of the present invention. Further, the embodiments of the present invention also relates to a computer program product comprising a computer readable medium and said mentioned computer program, wherein said computer program is included in the computer readable medium, and comprises of one or more from the group: Read-Only Memory (ROM), Programmable ROM (PROM), Erasable PROM (EPROM), Flash memory, Electrically EPROM (EEPROM) and hard disk drive.

The advantages of the methods according to the third aspect or the fourth aspect are the same as those for the corresponding claims according to the first and second aspects.

An "or" in this description and the corresponding claims is to be understood as a mathematical OR which covers "and" and "or", and is not to be understand as an XOR (exclusive OR).

Further applications and advantages of the embodiments of the present invention will be apparent from the following detailed description.

BRIEF DESCRIPTION OF THE DRAWINGS

The appended drawings are intended to clarify and explain different embodiments of the embodiments of the present invention, in which.

DETAILED DESCRIPTION OF EMBODIMENTS

In Dynamic Point Selection, the data transmission still occurs from a single ANd but the ANd-UNd assignment is dynamic. In particular, the ANd transmitting data to a particular UNd may change between subframes even if the ANd-UNd channels remains stationary. Dynamic point selection schemes are typical in coordination areas/clusters comprising multiple ANds.

Muting of spatio-time-frequency resources at ANds is an example of both Coordinated Scheduling and Dynamic Point Selection schemes.

Channel state information, CSI, at the transmitter side (ANds) is required for Coordinated Scheduling and Dynamic Point Selection schemes. Such a CSI may be the exact channel or a statistical representation thereof. Three mechanisms may be described for acquiring the CSI at the transmitter, namely Explicit Feedback, Implicit Feedback, and SRS. In particular, the first and second schemes rely on feedback from the UNd while the SRS based scheme consists in UL pilot signals. In feedback schemes, the UNd reports the channel properties of several ANds as well as statistical information regarding noise and interference. Hence, each ANd may acquire the channels between a particular UNd and neighboring ANds. However, feedback schemes may not be attractive in UNds due to the large number of ANds which leads to high power consumption at the UNds. Uplink (UL) pilot signals may then be more attractive in TDD UNds. However, such schemes may only provide the CSI at the transmitter for a single ANd-UNd pair. In particular, for a given ANd-UNd pair (let this ANd be termed ANd1), the channels between the UNd and the neighboring ANds are not acquired at the ANd1 using UL pilot signals. Note that such information is needed in both Coordinated Scheduling and Dynamic Point Selection schemes.

In LTE-Advanced, the Coordinated Scheduling and Dynamic Point Selection schemes are mainly based on UNd feedback. In particular, the UNds report a Channel Quality Indicator (CQI) as well as a Precoding Matrix Indicator (PMI) for each ANd. Alternatively, UNds may feedback the quantized channel or a statistical representation thereof (e.g., main eigenvalues/eigenvectors or the correlation matrix). In Coordinated Scheduling, communication among ANd through dedicated logical channels (which is typically an X2interface) is mainly for sharing the scheduling decisions. In case of Dynamic Point Selection, the ANds share a common scheduler and there is no need for having logical channels for communication among ANds.

Another approach is based on Sounding Reference Signals (SRSs). In particular, UNds transmit UL pilot signals that are used for acquiring the CSI at several ANds located on a neighborhood of the UNd.

Relying on UNd feedback for inter-cell interference coordination (ICIC) is not attractive in ultra-dense networks (UDN) due to the large energy requirements at the UNds and control-channel overhead. This means that there is an overhead caused by increasing the uplink control data (signaling) used for feedback the channel state information. On the other hand, estimating the channel from UL beacons at several ANds requires high user equipment transmit power (precoding methods are sensitive to poor channel estimates), large cyclic-prefix due to increased UNd-ANd distances (thus leading to poor spectral efficiency), and inter-cluster/cell coordination for UL beacon scheduling. Cyclic prefix is needed as a guard interval in time domain between orthogonal frequency-division multiplexing (OFDM) symbols to compensate inter-symbol interference. Large inter-site distances will cause more inter-symbol interference, because increased distances between access nodes and user equipments will increase channel propagation delays and delay spreads.

One significant disadvantage of previous solutions is the outer-loop link adaptation, which is used to reach certain block error rate (BLER) target, by updating Signal-to-Interference-plus-Noise Ratio (SINR) offset for SINR estimation based on experienced BLER. In upcoming advanced MIMO systems, interference levels may be changing at every transmission time interval (TTI) significantly due to dynamic scheduling and beamforming. Beamforming means that the base station directs its transmission power with narrow beams towards scheduled users. Hence, interference caused to neighboring cells may be very regional and unpredictable if interference information is not shared based on scheduling decisions.

This claimed application thus aims at predicting and/or mitigating the interference experienced by users in wireless networks which is caused by neighboring and possibly uncoordinated clusters/access-nodes. This may be solved by sharing interference information with the neighboring/interfering clusters/access-nodes regarding the scheduled decisions.

Figure 1:
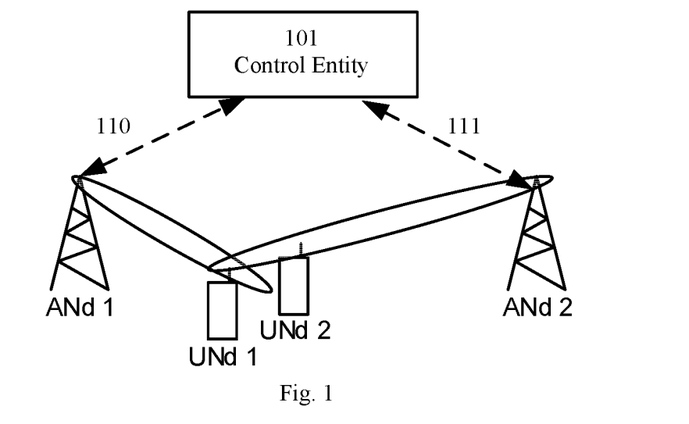
FIG. 1 shows a wireless communication system according to embodiments of the invention.

FIG. 1 illustrates the interference experienced by users at cluster/cell borders. Therein, UNd1 is being scheduled by ANd1, and UNd2 is being scheduled by ANd2. However, ANd1 causes interference to UNd2. Similarly, ANd2 causes interference to UNd1. This may be understood by noting that the transmission from ANd1 towards UNd1, modeled using w1, "leaks" to UNd2. Such leaking is modeled using h21*w1. This is analogous to the interference caused by ANd2 to UNd1. Taking such interference into account allows for accurate link adaptation and improves the overall system throughput. Mitigating the inter-cluster interference is also desirable, especially when the interference experienced by the users is significant. The cluster shown in FIG. 1 comprises a control entity 101, which also may be called a control unit or a control device. The control entity 101 is configured to communicate with the first and second access nodes, ANd1 and ANd2. The control entity is thus configured to instruct the second access node ANd2 to share, 111, an interference leakage towards user UNd2. The interference leakage is communicated to ANd1 which is instructed to calculate a Signal-to-Interference-plus-Noise Ratio, SINR, value based on the interference leakage from the second access node ANd2. ANd1 is then instructed to choose a modulation and coding scheme, MCS, for each user based on the SINR of the second access node ANd2.

Further to this, the control entity 101 is configured to instruct the first access node ANd1 to share an interference leakage towards the user UNd1. The second access node ANd2 is instructed to calculate a SINR value based on the interference leakage from the first access node ANd1. Thereafter the second access node ANd2 is instructed to choose a modulation and coding scheme, MCS, for each user based on the SINR of the first access node ANd1.

In this case the interference leakage information is shared between the first, ANd1, and second, ANd2, access nodes via the control entity. Other examples of schemes for sharing interference leakage are illustrated in FIG. 2-FIG. 5.

Figure 2:
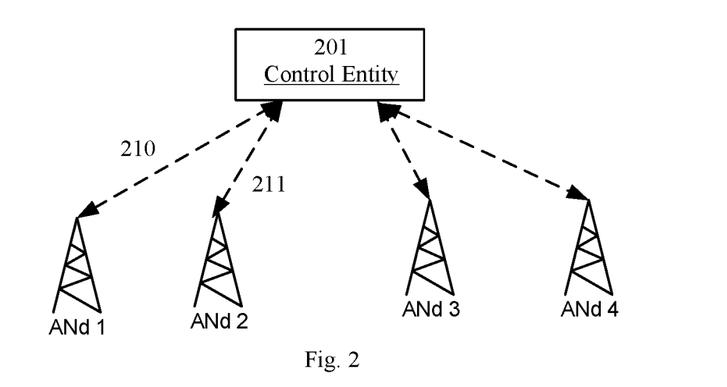
FIG. 2 shows another wireless communication system according to embodiments of the invention.

As shown in FIG. 2, one control entity 201 may be used to coordinate and share the interference leakage information, 210, 211, between more than two access nodes, ANd1, ANd2, ANd3 and ANd4. This may illustrate a scheme where the ANds share a common scheduling entity that handles a certain geographical area. The MCS selection may be performed by the control entity 201 for a plurality of access nodes, ANd1, ANd2, ANd3 and ANd4.

Figure 3:
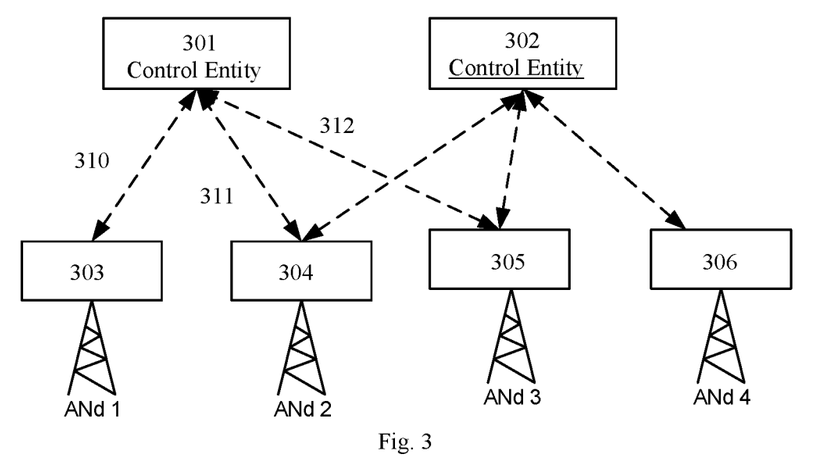
FIG. 3 shows another wireless communication system according to embodiments of the invention.

Alternatively, as shown in FIG. 3, two or more control entities 301 and 302, may be used to coordinate and share the interference leakage information, 310, 311 and 312, between more than two access nodes, ANd1, ANd2, ANd3 and ANd4. The two control entities 301 and 302 have inter-cluster interfaces to cluster edge access nodes. Hence, scheduling decisions may be shared over cluster edges. In this case it is assumed that link adaptation functionality is distributed between a centralized control entity 301, 302 and an access node. Hence, the control entity may calculate interference information and share it directly to access nodes. Then MCS selection takes place in the access nodes 303, 304, 305 and 306.

Figure 4:
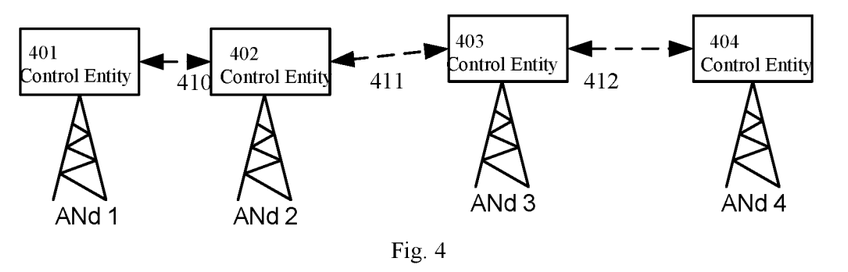
FIG. 4 shows another wireless communication system according to embodiments of the invention.

In FIG. 4 it is shown that each access node ANd1, ANd2, ANd3 and ANd4 may comprise a corresponding control entity 401, 402, 403 and 404 respectively. The control entity may thus be comprised in the respective access node ANd1, ANd2, ANd3 and ANd4. The control entities may be configured to communicate with each other, e.g. the first and second control entities 401 and 402 communicate via 410, the second and third control entities 402 and 403 communicate via 411 and the third and fourth control entities 403 and 404 communicate via 412. Thus they may exchange instructions and share data such as interference leakage etc. The ANds thus have direct connection among themselves, including their neighbors. Such a connection enables scheduling decision sharing without a centralized control entity.

Figure 5:
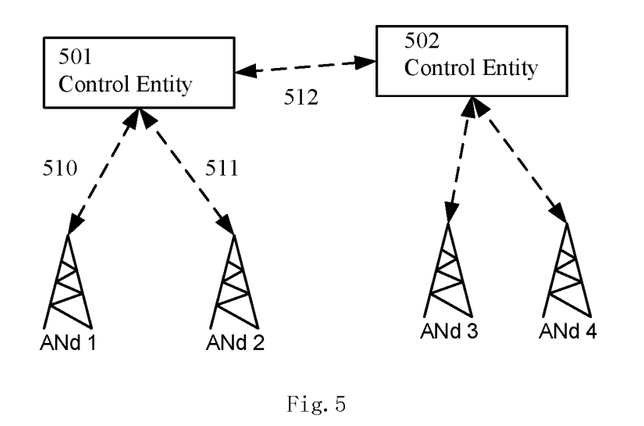
FIG. 5 shows another wireless communication system according to embodiments of the invention.

Similarly, in FIG. 5, the control entities 501 and 502 of two clusters may be configured to communicate 512 to exchange interference leakage information and/or instructions. The respective control entity communicates with the access node in the respective cluster, e.g. the first control entity 501 communicating 510 with ANd1 and 511 with ANd2. The centralized control entities 501, 502 may thus have an interface among themselves which can be used for sharing cluster edge scheduling decisions.

We consider a group of clusters each of which comprises one or more ANds. On a Multi-User Multiple-Input Multiple-Output (MU-MIMO) setting each cluster comprises a single ANd. Clusters comprising multiple ANds may be based on Coordinated Beamforming (CB) or Joint-Transmission (JT). Any transmission from a neighboring ANd is a potential source of interference. In principle, the ANds could share the interference they cause to the users scheduled by the neighboring ANds. However, an implementation dependent threshold could be used below which no interference information is shared.

It is assumed that the control entity can obtain information about users, for which caused interference will be calculated and shared. Interference leakage may be estimated by measuring channel to users within a neighboring area or by estimating it with the knowledge of geographical position of the users. Channel measurement may be made e.g. from pilot signals sent by user nodes.

Sharing such levels of interference leakage allows for accurate link adaptation within each scheduling area due to the improved estimate of the SINR experienced by each user. Such a scheme differs from CoMP, either on a CB or JT fashion, as well as from interference-alignment schemes since only the interference levels are shared. The solution also reduces the capacity requirements of the link connecting the clusters with respect to CoMP and interference-alignment schemes.

In particular, let $U_A$ and $U_B$ denote the set of UNds belonging (or being scheduled) by the ANd(s) in cluster A and B, respectively. Let $I_{BA}$ denote the interference experienced by a user belonging to Cluster B caused by the precoders of the ANd(s) in Cluster A. In particular, once the user-scheduling for the upcoming TTI is done at Cluster A, and after Cluster A has acquired the CSI of the users belonging to Cluster B, the interference levels caused by the precoders for the scheduled users belonging to cluster A are shared to cluster B. Cluster B is then able to calculate the interference experienced by the users belonging to its cluster. This allows Cluster B to adapt the links of its scheduled users by adjusting their modulation and coding schemes (MCS). A re-scheduling procedure of users in Cluster B may be needed in case the interference experienced by the scheduled users is significant. A similar procedure is done at Cluster A. Note that $I_{BA}$ may be determined from UL beacons. For example, a user belonging to Cluster B transmits an UL beacon that is acquired at the ANd(s) in Cluster A, and used for calculating the MIMO channel, say $H_{BA}$. The interference caused by the ANd(s) in Cluster A is found once the precoders for the scheduled users in Cluster A are determined, say $W_A$. In particular, we have $I_{BA} = W_A^H H_{BA}$. This procedure is also valid for multi-cluster environments, assuming that the different clusters are able to estimate the channel of the users in Cluster B.

According to an embodiment, the aim is to minimize inter-cluster interference based on the UNds locations. In particular, the positions of the scheduled users in cluster A, which is known by cluster A, are shared to cluster B. The position may be the position in three dimensions. Cluster B has the responsibility to minimize the interference to the scheduled users in cluster A by minimizing the transmitted power in the direction of the scheduled users in cluster A. This may be based on Radio Environment Maps and achieved by means of the Linearly Constrained Minimum Variance (LCMV) Beamformer. In particular, the weights of the LCMV beamformer may be found as follows:

$$w = R_x^{-1} C [C^H R_x^{-1} C]^{-1} f$$

where $R_x$ denotes the array covariance matrix, C denotes the constraint matrix (including the location of the UNds), and f denotes the response vector (each element ranges between 0 and 1, thus defining the allowed relative transmission power). Moreover, $C^H$ denotes the Hermitian transpose operator of matrix C. Cluster B may also send to Cluster A the level of interference caused to the scheduled users in Cluster A. This would allow Cluster A to perform link adaptation accurately. Again, schemes for sharing the location of the scheduled UNds are shown in FIG. 2-FIG. 5.

Using the location of the UNds in order to minimize the inter-cluster interference requires a Line of Sight (LoS) condition between the scheduled users and the ANds in the interfering (neighboring) cluster. However, such a requirement can easily be satisfied in ultra-dense networks where the inter-ANd distance may be around 50 m. The advantage of using the 3D location of the UNds in order to minimize the inter-cluster interference is mainly due to the small capacity requirements needed to share such information. This is especially true when such an approach is compared to sharing the channel matrices of the scheduled users. Another important advantage of using the location of the UNds is the robustness to pilot contamination. In particular, even with pilot contamination, the position of the UNd may be estimated using angular power spectral methods (this of course assumes the power of the UNd is larger than that contaminating the pilot). Having the position of the UNd, along with the precoders and REM (path-loss and shadow-fading), the interference caused by "cross-links" is found.

As a further embodiment, inter-cluster interference at the UNd may be reduced based on the ANds' location. In particular, the UNds that are equipped with directional antennas or multiantenna terminals may minimize the inter-cluster interference by knowing the location of the serving ANds as well as the location of the interfering ANds. Sharing such information may be done by the serving cluster. For example, the scheduled users in cluster A would receive the location (relative to the scheduled users' coordinate system) of the serving ANds in cluster A as well as the location of the interfering ANds in cluster B. Such information could be shared from cluster A on a control channel, for example. Then, the scheduled users in cluster A could perform geometric beamforming by maximizing the received power in the direction of the serving ANds in cluster A as well as minimizing the received power in the direction of the interfering ANds belonging to cluster B. The Linearly Constrained Minimum Variance Beamformer could also be used to accomplish such a task.

In addition to downlink usage, the claimed solution may also be used for uplink interference coordination and link adaptation. As shown in FIG. 2, in addition to downlink scheduling and/or interference information, also uplink scheduling decisions and/or interference information could be shared to neighbors. Hence, interference for uplink transmissions may be calculated more precisely as well and thus modulation and coding scheme (MCS) selection may be more accurate, which improves also uplink performance.

In addition to improving link adaptation, if it is noticed after interference information exchange that two users scheduled by neighboring access nodes are interfering each other so badly that it is expected that transmission will not succeed even with lowest available modulation and coding, then both or other access node can back off from scheduling user and reschedule this particular user e.g. to next available TTI with uplink resources available. In such a case the interference leakage will be over a threshold level. One example could be that back off is based on agreed turns in back offing i.e. e.g. in case of two time synchronized access nodes other access nodes will back off when mod(subframe number, 2)=1 and other will back off when mod(subframe number, 2)=0. Alternatively the scheduling back off for a particular user in case of interference collision may be based on e.g. some randomized back off time.

Figure 6:
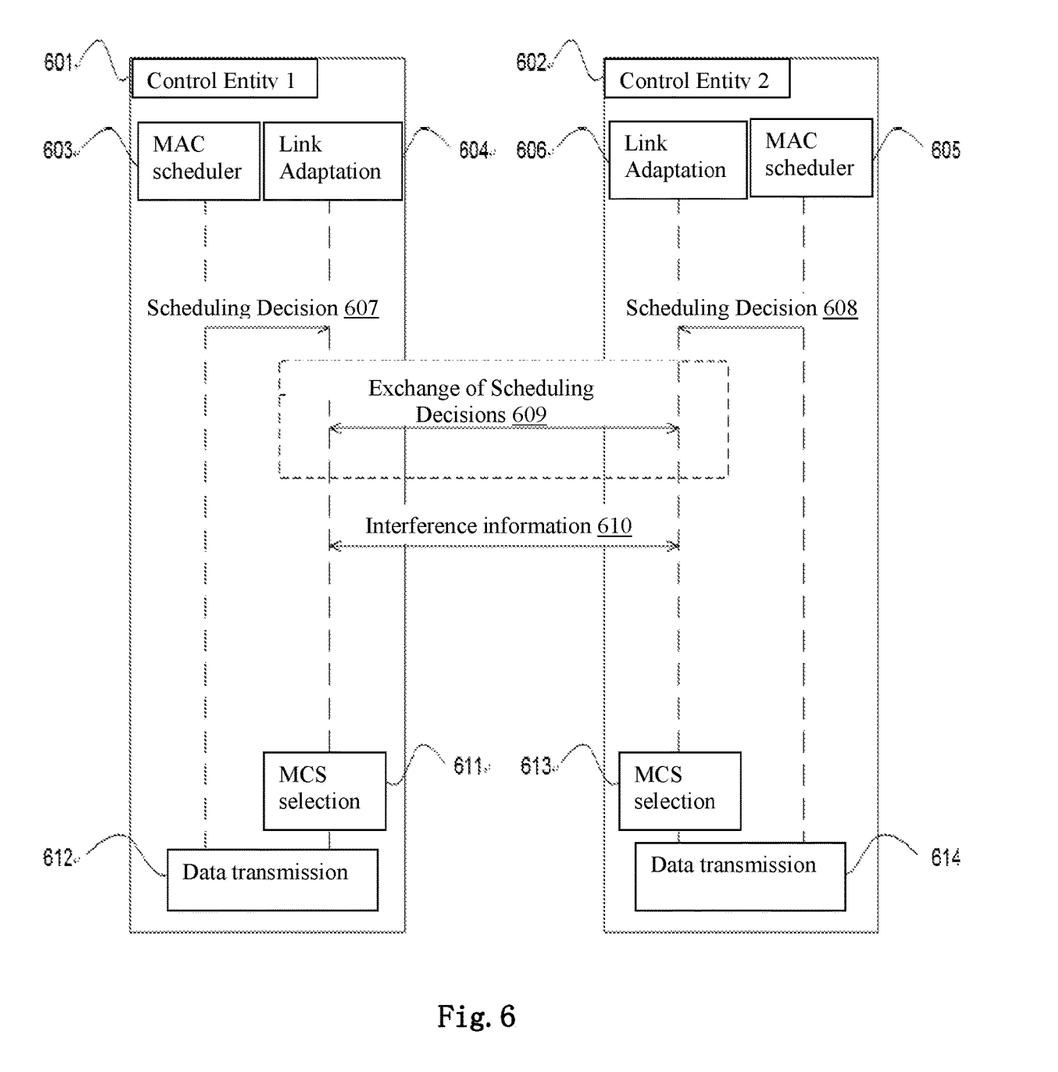
FIG. 6 shows a method according to embodiments of the invention.

FIG. 6 describes a message sequence chart illustrating an example of the communication in FIG. 1. A first control entity 601 and a second control entity 602 performs a scheduling decision 607, 608 in the MAC scheduler 603, 605 for link adaptation 604, 606. The scheduling decision may be exchanged 609 between the control entities 601, 602. Interference leakage information is obtained from each user and is shared 610 between the control entities 601, 602. A modulation and coding scheme, MCS, is selected 611, 613 for each user taking the interference information from the other respective control entity into account. This is done by calculating a SINR value based on the interference leakage from the second access node and, based in the SINR value, to choose a modulation and coding scheme, MCS, for each user. Thereafter data is transmitted 612, 614, for each user.

Figure 7:
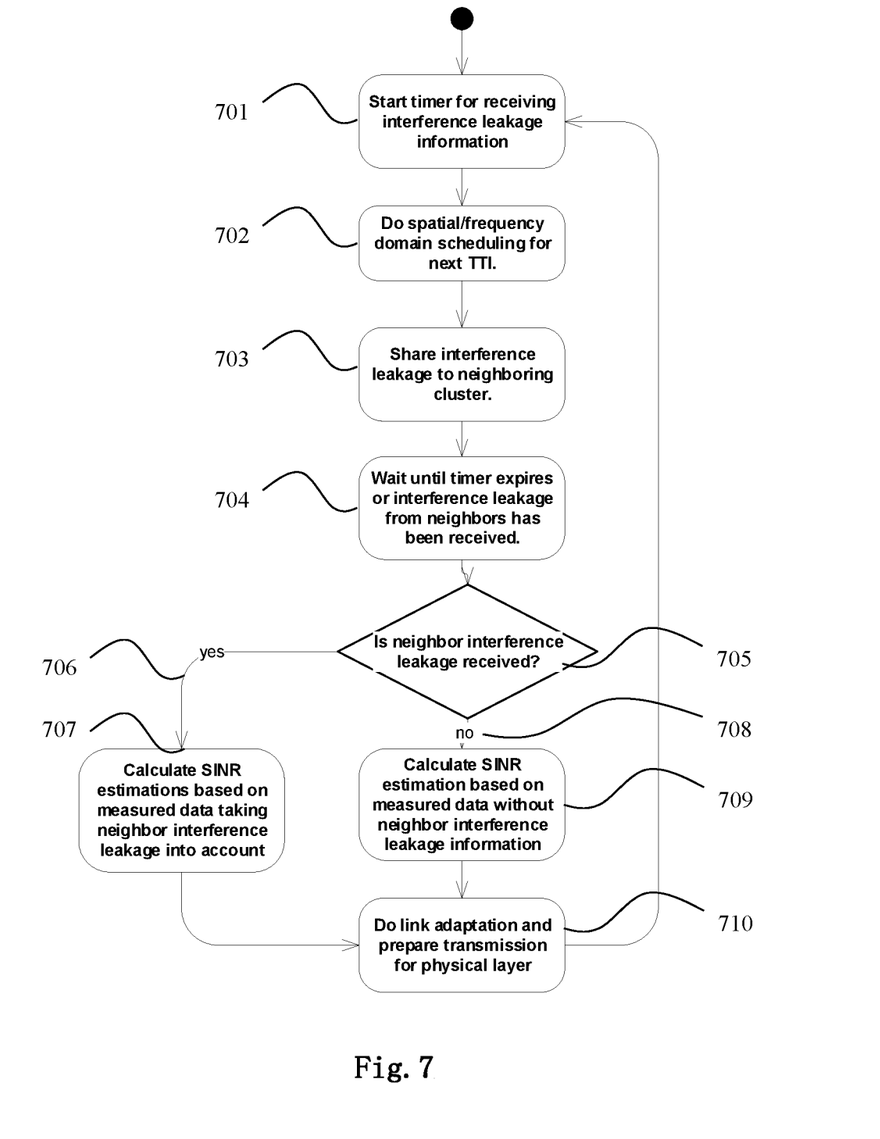
FIG. 7 shows another method according to embodiments of the invention.

In FIG. 7, a TTI scheduling loop is illustrated. Each cluster performs its own scheduling decisions, 702. The interference leakage information is shared 703 to neighboring clusters. Such information may be based on channel measurements or position information or both, for example. Each cluster may wait for interference information from neighboring entities before the actual transmission as long as other requirements (latency, quality-of-service, etc.) are not compromised. The important issue to be taken into account is that the time needed for receiving interference information should not compromise other system requirements, as illustrated by a timer 701 and 704. The time between last moment of interference leakage information reception and the actual transmission may be specified in a way that there is enough time for link adaptation and performing the actual transmission on physical layer. After all interference information is gathered or interference information reception timer has expired, 705, the SINR is calculated based on measured data taking neighbor interference into account, 707, or based on measured data without taking neighbor interference into account, 709. Link adaptation 710 is then done with available information and transmission is prepared for physical layer. Timing synchronization is assumed between nodes sharing such interference leakage information.

The invention claimed is:

1. A control entity for connecting to at least a first access node and at least a second access node, wherein the control entity comprises a processor configured to:
   instruct the second access node to share an interference leakage towards user equipment being scheduled by the second access node;
   instruct the first access node to calculate a Signal-to-Interference-plus-Noise Ratio (SINR) value based on the interference leakage from the second access node; and
   instruct the first access node to choose a modulation and coding scheme (MCS) for the user equipment being scheduled by the first access node based on the SINK; and, wherein the SINR value is a first SINR value and the interference leakage is a first interference leakage, and wherein the processor is further configured to:
   instruct the first access node to share a second interference leakage towards user equipment being scheduled by the first access node,
   instruct the second access node to calculate a second SINR value based on the second interference leakage from the first access node; and
   instruct the second access node to choose a modulation and coding scheme (MCS) for user equipment being scheduled by the second access node based on the second SINR.

2. The control entity according to claim 1, herein the processor is configured to instruct the first access node to share the interference leakage toward the user equipment directly to the second access node.

3. The control entity according to claim 1, wherein the processor is configured to instruct the second access node to share the interference leakage toward the user equipment directly to the first access node.

4. The control entity according to claim 1, wherein the processor is further configured to instruct the first access node to perform a re-scheduling of one or more users if the interference leakage of the second access node is above a threshold level.

5. The control entity according to claim 1, wherein the processor is configured to communicate with the at least one second access node via a second control entity.

6. A method for a wireless communication system, the method comprising;
  receiving, by a first access node, interference leakage towards user equipment being scheduled by a second access node;
  calculating, by the first access node, a Signal-to-Interference-plus-Noise Ratio (SINR) value based on the interference leakage from the second access node; and
  choosing, by the first access node, a modulation and coding scheme (MCS) for user equipment being scheduled by a first access node-based on the SINR; and, wherein the SINR value is a first SINR value and the interference leakage is a first interference leakage, and wherein the method further comprises:
  sharing, by the first access node, a second interference leakage towards user equipment being scheduled by the first access node, wherein the second interference leakage from the first access node is for instructing the second access node to calculate a second SINR value based on the second interference leakage from the first access node, the second SINR being for instructing the second access node to choose a modulation and coding scheme (MCS) for user equipment scheduled by the second access node based on the second SINR.

7. A computer program product, comprising computer executable instructions stored on a non-transitory computer-readable medium, wherein when the computer executable instructions are executed by a processor, causes the processor to perform a method according to claim 6.

* * * * *

UNITED STATES PATENT AND TRADEMARK OFFICE
CERTIFICATE OF CORRECTION

PATENT NO. : 10,771,184 B2
APPLICATION NO. : 15/958003
DATED : September 8, 2020
INVENTOR(S) : Petteri Kela et al.

Page 1 of 1

It is certified that error appears in the above-identified patent and that said Letters Patent is hereby corrected as shown below:

In the Claims

Column 10, Line 52, please delete "SINK" and insert --SINR-- between "based on the" and ";".

Column 10, Line 66, please delete "herein" and insert --wherein-- between "claim 1," and "the".

Signed and Sealed this
Twentieth Day of April, 2021

Drew Hirshfeld
*Performing the Functions and Duties of the
Under Secretary of Commerce for Intellectual Property and
Director of the United States Patent and Trademark Office*